United States Patent [19]

Smith

[11] Patent Number: 4,805,806

[45] Date of Patent: Feb. 21, 1989

[54] APPARATUS FOR DISPENSING LIQUEFIED GAS

[75] Inventor: Bryan K. Smith, Chertsey, United Kingdom

[73] Assignee: BOC Limited, Windlesham, United Kingdom

[21] Appl. No.: 327,533

[22] Filed: Dec. 4, 1981

[30] Foreign Application Priority Data

Dec. 17, 1980 [GB] United Kingdom ............... 8040342

[51] Int. Cl.⁴ ............................................. B67D 5/62
[52] U.S. Cl. ................................... 222/146.6; 62/55
[58] Field of Search ............... 222/146 C, 146 R, 504, 222/510, 518, 65, 566, 567; 62/45, 47, 49, 51, 52, 55; 220/420, 445

[56] References Cited

U.S. PATENT DOCUMENTS

| | | | |
|---|---|---|---|
| 2,536,925 | 10/1960 | Schmidt | 222/65 |
| 2,996,039 | 12/1960 | Williamson | 62/55 |
| 3,097,084 | 7/1963 | Putman | 220/420 |
| 3,119,238 | 11/1964 | Chamberlain et al. | 220/420 |
| 3,386,256 | 6/1968 | Alexander | 62/55 |
| 3,435,992 | 4/1969 | Tisdale et al. | 222/566 |
| 3,464,598 | 9/1969 | Curry, Jr. | 222/566 |
| 3,596,804 | 8/1971 | Lancaster et al. | 222/566 |
| 4,009,593 | 3/1977 | Davis | 222/146 C |
| 4,089,438 | 5/1978 | Steels | 222/146 C |
| 4,161,971 | 7/1979 | Arzberger et al. | 222/146 C |
| 4,171,069 | 10/1979 | Cornelius et al. | 222/146 C |
| 4,203,299 | 5/1980 | Dinglinger | 62/49 |
| 4,215,103 | 7/1980 | Millington | 222/146 C |
| 4,216,879 | 8/1980 | McMillin | 222/146 C |
| 4,267,947 | 5/1981 | Wasserstrom | 222/504 |
| 4,270,673 | 6/1981 | Rodth | 222/146 C |

FOREIGN PATENT DOCUMENTS

| | | |
|---|---|---|
| 2387438 | 4/1977 | France ..................... 222/65 |
| 660120 | 10/1951 | United Kingdom . |
| 1055267 | 1/1967 | United Kingdom . |
| 1218756 | 1/1971 | United Kingdom . |
| 1349677 | 4/1974 | United Kingdom . |
| 1455652 | 11/1976 | United Kingdom . |
| 1504648 | 3/1978 | United Kingdom . |
| 1511097 | 5/1978 | United Kingdom . |
| 1549416 | 8/1979 | United Kingdom . |

OTHER PUBLICATIONS

"Reynolds Liquid Nitrogen Technology"; by Reynolds Can Division; Reynolds Metals Co., P.O. Box 27003, Richmond, Va. 23261.

Primary Examiner—Kevin P. Shaver
Assistant Examiner—Kenneth Noland
Attorney, Agent, or Firm—Larry R. Cassett; David A. Draegert

[57] ABSTRACT

Apparatus for dispensing metered quantities of liquefied gas such as liquid includes a thermally-insulated reservoir having at its bottom an outlet passage leading to a dispensing orifice outside the thermal insulator. There is a single valve for controlling admission of the liquefied gas to the dispensing orifice. The passage is in heat conductive relationship with a block of heat conductive material in the liquefied gas so as to maintain the passage sufficiently cold to prevent substantial evaporation of liquefied gas within the part of the passage with the reservoir. The valve may be cam or solenoid actuated to dispense drop of liquefied gas of chosen volume.

16 Claims, 4 Drawing Sheets

APPARATUS FOR DISPENSING LIQUEFIED GAS

BACKGROUND TO THE INVENTION

This invention relates to apparatus for dispensing quantities of liquefied gas having a boiling point below ambient temperature. It is particularly concerned with a method and apparatus for dispensing droplets of chosen or suitable volume of a cryogenic liquid, for example, liquid nitrogen.

Liquefied gases are typically used in industry in bulk quantities and can thus be metered by conventional methods. One some occasions, however, a need arises for only a small quantity, for example, up to a few milliliters, of liquefied gas to be delivered. Such a need may arise when bottling a beverage. It is often desirable for the neck of each bottle to contain an atmosphere consisting essentially of a gas such as nitrogen that does not adversely affect the quality of the beverage. Moreover, even if nitrogen is not required for this reason it has been found that in a closed plastics bottle containing a beverage a partial vacuum can be created in its neck as a result of a reduction in temperature, which partial vacuum can cause a wall of the bottle to be sucked inwards, and accordingly filling the neckspace with a small volume of nitrogen (or other suitable gas) before fitting a closure to the bottle will guard against the creation of such a partial vacuum. Another example of the need for an apparatus and method for delivering a small volume of liquefied gas such as liquid nitrogen is in the freezing of individual comestible items.

Previous attempts to solve the problem of delivering or dispensing small metered quantities of liquid nitrogen (or other liquefied gas) have involved employing a vertical delivery pipe having two valves in it. By opening the upper valve a chosen volume of liquefied gas may be trapped between the valves. The upper valve is then closed and the lower one opened. Thus, a chosen volume of liquefied gas can be dispensed.

Such an apparatus suffers from the drawback that liquefied gases such as liquid nitrogen having a boiling point ($-196°$ C.) well below ambient temperature, vaporise very readily, and that, in practice, it is difficult to avoid vaporisation of some of the liquid nitrogen between the valves from taking place before the liquid nitrogen can be dispensed. Moreover, in practice, the amount of vapour that is formed varies.

OBJECT OF THE INVENTION

It is an aim of the present invention to provide an apparatus for dispensing a liquefied gas such as liquid nitrogen, whereby quantities of the liquid of a generally reproduceable volume can be dispensed.

SUMMARY OF THE INVENTION

According to the present invention there is provided apparatus for dispensing liquefied gas comprising a thermally-insulated reservoir having at its bottom an outlet passage which extends from within the reservoir to a dispensing orifice outside the thermal insulator, and which has a single valve for controlling admission of liquefied gas thereto, and a block of heat conductive material within the reservoir, the passage being in heat conductive relationship with the block, whereby in use the block maintains the passage sufficiently cold to prevent substantial evaporation of liquefied gas within the part of the passage in the reservoir.

In order to provide a good heat conductive relationship between the outlet passage and the heat conductive block it is possible for the block itself to define the outlet passage and dispensing orifice, e.g. by having a simple bore through it. Alternatively, the outlet passage and dispensing orifice may be defined by a delivery tube, that portion of such tube situated within the reservoir being received within the block.

The block in effect acts as a 'cold sink' generally at substantially the temperature of the liquefied gas in operation of the apparatus and thereby maintaining the outlet passage and its contents at substantially the temperature of the liquefied gas. In order for the block to be effective as a 'cold sink' it is desirably relatively massive in comparison with the outlet passage (or that part of the outlet passage within the reservoir). For example, the diameter of the block may be at least twice and preferably at least three times that of the outlet passage.

A preferred kind of valve for use in the dispensing apparatus according to the invention comprises a valve member, a valve seat, a compression spring biasing the valve member into valve-closing engagement with the valve seat, a valve body having at least one inlet in communication, in use of the apparatus, with the liquefied gas in the reservoir, and means for displacing the valve member against the bias of the spring into a position in which the valve is open. Typically, the means for displacing the valve member includes a rod connected to or integral with the valve member. Thus, the valve can be actuated from outside the reservoir. For example, the rod may be connected to a pivoted arm operable by a cam to open and close the valve. Alternatively, the rod can be operated by means of a solenoid actuator. The solenoid actuator may be repeatedly energised and de-energised in accordance with a predetermined time-cycle. Thus, for example, drops of liquefied gas of substantially uniform size may be delivered at regular intervals corresponding, for example, with the passage of comestibles to be frozen or cooled underneath the delivery orifice.

If desired, the dispensing apparatus may be capable of simultaneously dispensing a plurality of drops or droplets of liquefied gas. Thus, there may be a plurality of spaced-apart outlet passages each associated with its own valve and dispensing orifice.

The aforesaid valve seat may be provided by a face of the block or take the form of a nozzle removably mounted on the block. By having a set of such nozzles of different sizes from one another it is possible to select one of an appropriate size such that a chosen volume of liquefied gas is delivered in each drop, and subsequently adjust this volume by replacing the selected nozzle with one of a different size.

There are preferably means for venting vaporised liquefied gas from a vessel defining a reservoir so as to maintain the headspace in such vessel at substantially constant pressure. Preferably, the dispensing apparatus according to the invention additionally includes level detectors operatively associated with means for replenishing the reservoir with liquefied gas so as to maintain an approximately constant liquid level in the reservoir. Maintaining the headspace at substantially constant pressure and the liquid level in the reservoir approximately constant facilitates the dispensing of droplets of liquefied gas of uniform size.

The dispensing apparatus according to the invention is particularly suited to the dispensing of drops (or droplets) of liquid nitrogen.

BRIEF DESCRIPTION OF THE DRAWINGS

Apparatus according to the invention for dispensing drops (or droplets) of liquid nitrogen will now be described by way of example with reference to the accompanying drawings, in which.

DESCRIPTION OF PREFERRED EMBODIMENTS OF THE INVENTION

Figure 1:
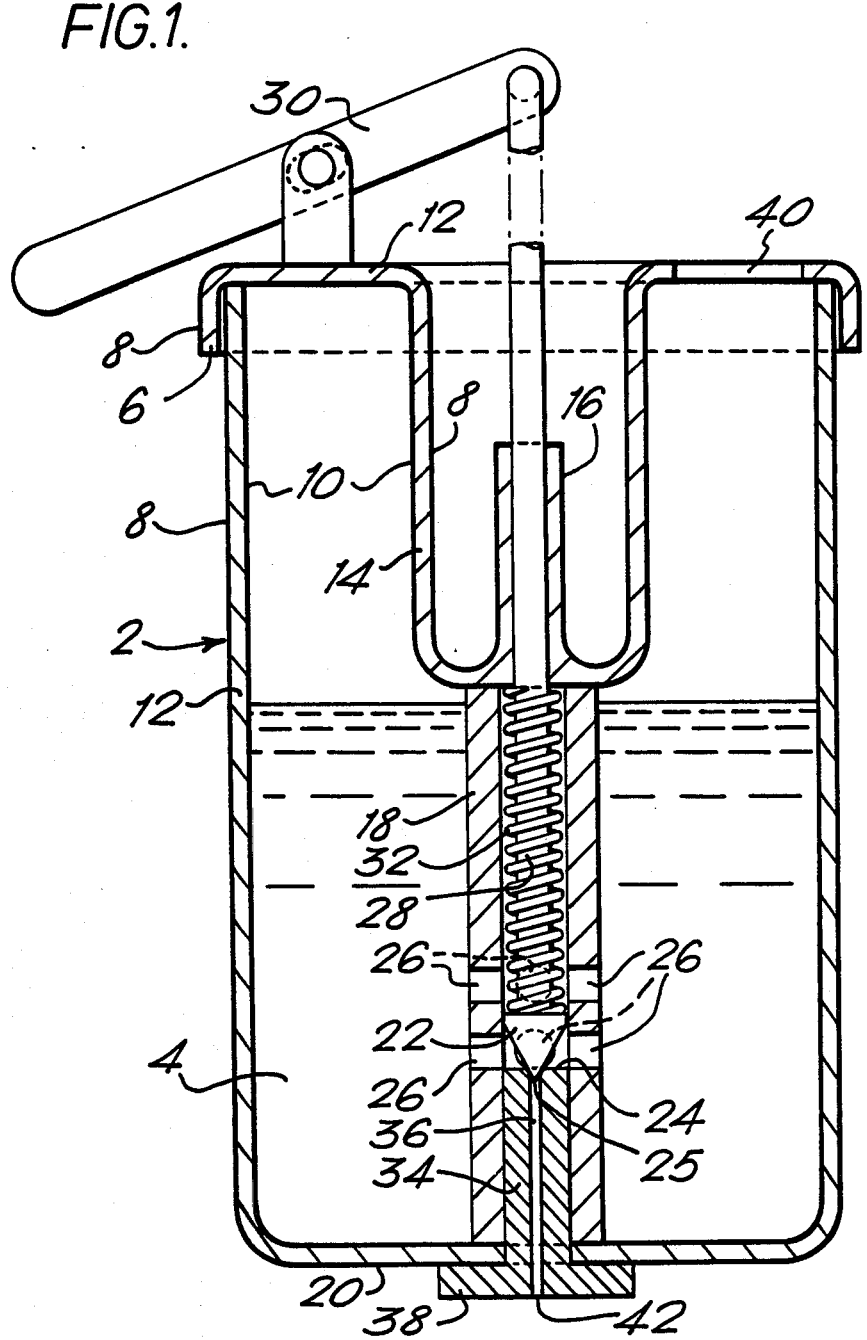
FIG. 1 is a schematic elevation, partly in section, of an apparatus for dispensing droplets of liquid nitrogen.
Figure 2:
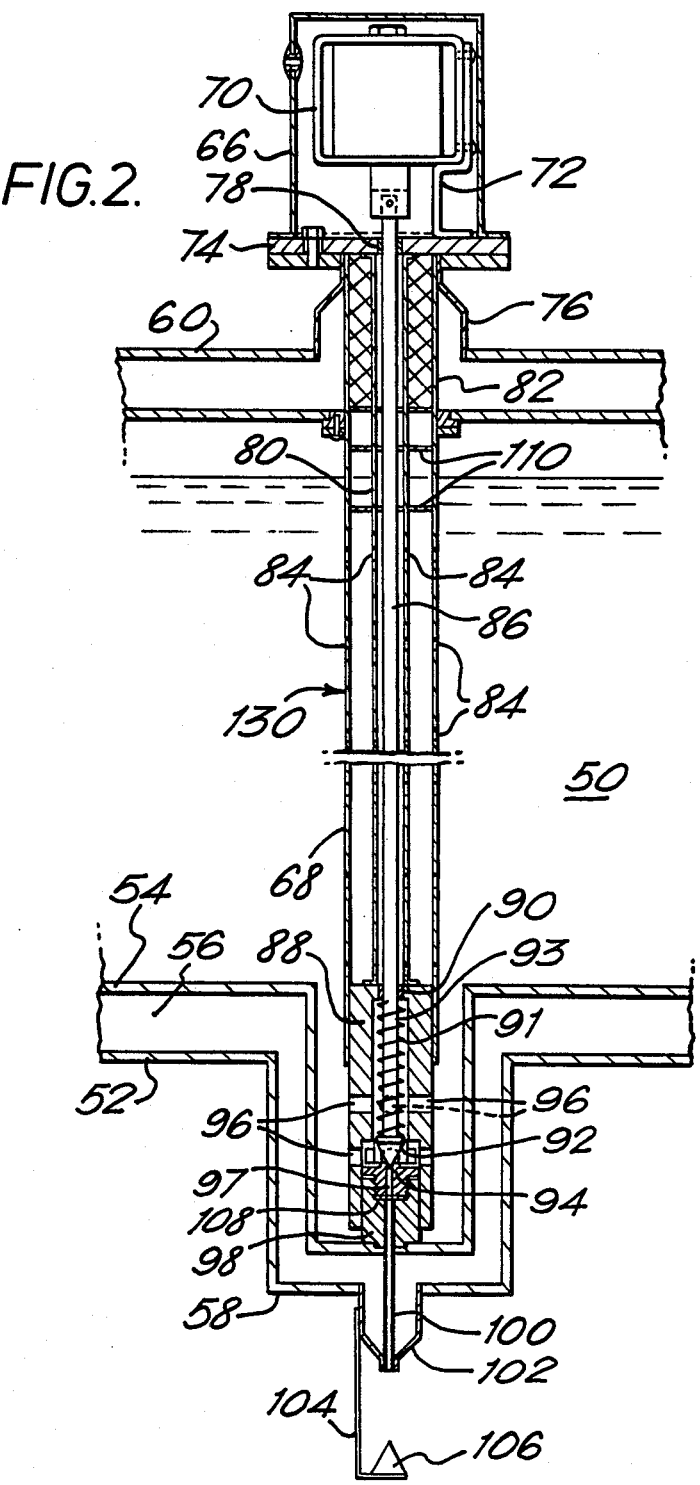
FIG. 2 is a schematic side elevation, partly in section, of an alternative apparatus for dispensing droplets of liquid nitrogen.

Referring to FIG. 1 of the drawings, a liquid nitrogen dispenser 2 includes a reservoir 4 and a closure 6. The reservoir 4 and closure 6 have inner walls 8 and outer walls 10, typically of stainless steel or aluminium, with the space 12 between the walls 8 and 10 being thermally insulated, e.g. by being filled with thermally-insulating material and/or by being evacuated.

The closure 6 has a vent opening 40 and a centrally located depressed portion 14 with a re-entrant spigot 16. Within the reservoir 4, a centrally-located vertical hollow column 18 extends from the bottom of the depressed portion 14 of the closure 6 to the base 20 of the reservoir 4. A generally conical valve member 22 is located within the column 18. The valve member 22 has a nose 25 adapted to make a fluid-tight engagement with a valve seat 24 defined by the top face of a vertical, cylindrical block 34 of brass or other metal or alloy that is a good conductor of heat. The block 34 has a base 38 of enlarged diameter such that it is the shape of an inverted T, the head of the T being situated outside the thermally insulated base of the reservoir 4 and the stalk or stem of the T extending through the base 20 into the interior of the reservoir. The stem or stalk of the block 34 engages the interior of the column 18. The block 34 is coaxial with the column 18 and with an outlet passage 36 formed through the block 34 and extending from the top face 24 to the bottom face of the block where it ends in a dispensing orifice 42. Eight inlets 26 are situated in the wall of the column 18 at levels above the valve seat (defined by the face 24 of the block 34).

The valve member 22 is connected to a vertical rod 28 coaxial with the column 18 and the spigot 16, through which the rod extends. The top end of the rod 28 is connected to a pivoted arm 30 which may be hand-operated, or preferably operated mechanically, e.g. by means of a cam (not shown). A spring 32 is situated within the annular space defined between the push rod 28 and the column 18. Spring 32 is held under compression between the valve member 22 and the closure 6 and thereby (as shown) biases the valve member 22 into a valve-closing position. However, depression of the left-hand end (as shown) of the arm 30 will raise the rod 28 and hence the valve member 22 against the bias of the spring 32 thereby opening the valve.

In order to use the dispenser shown in FIG. 1, it may be filled, e.g. to the level shown, with liquid nitrogen. Depression of the arm 30 opens the valve, as described above. Liquid nitrogen flows under gravity through the inlets 26 into the passage 36. The volume of liquid nitrogen that enters the passage 36 is proportional to the time that the valve is open. By means of a suitable cam arrangement the valve may be kept open for a chosen period of time before being closed again. Analogously, a suitable cam arrangement will enable the valve to be kept closed for a chosen period of time before being opened again. Thus, it may be arranged for the apparatus to dispense at chosen intervals a chosen volume of liquid nitrogen.

The block 34 is situated to be in good heat conductive relationship with the liquid nitrogen. The block can thus be maintained at the temperature of the liquid nitrogen. Since the passage 36 is formed through the block 34, the liquid nitrogen can be maintained in the passage at a temperature such that the liquid nitrogen does not evaporate in the passage 36 before it can be dispensed in the form of a drop or droplet.

The passage 36 may typically have a diameter of 2 mm and the stem of the block 34 a diameter of 8 mm. It is desirable for the wall thickness of the block to be greater than the diameter of the passage 36 so as to maintain the nitrogen substantially liquid in the passage 36. Moreover, it is desirable for the height of the block to be greater than its diameter.

Nitrogen vapour evolved from the liquid nitrogen in the reservoir 4 is vented through the opening 40. Thus, the pressure in the ullage or head space of the vessel is maintained at atmospheric level. If the liquid nitrogen level in the dispenser is maintained substantially constant, the pressure forcing the liquid nitrogen into the passage 36 when the valve is open will be substantially constant, and thus it is possible to deliver a controlled quantity of liquid nitrogen from the dispenser. Conventional level control means may be employed to maintain the level of liquid nitrogen between acceptable limits.

Referring now to FIGS. 2 to 6, a liquid nitrogen dispenser includes a reservoir or vessel 50 having an outer wall 52 spaced apart from an inner wall 54. The space 56 between the walls 52 and 54 is evacuated so as to provide vacuum-insulation for the reservoir 50.

The reservoir 50 contains six dispensing units 130 (see FIG. 5) for dispensing liquid nitrogen. Each dispensing unit 130 extends from top to bottom of the reservoir 50 and includes a hollow vertical glass-fibre column (or tube) 68. The top of the column 68 extends through the vacuum insulation at the top 60 of the reservoir 50 and is received in a generally conical end-piece 76 which is in vacuum-tight arrangement with the outer wall 52. The bottom of the column 60 extends into a tubular projection 58 from the bottom of the reservoir, the projection 58 forming part of the reservoir. The bottom of the column 68 holds the upper portion of a generally cylindrical valve body 88 extending further into the projection 58. A vertical guide tube 80 is situated coaxially within the column 68. The top of the guide tube 80 abuts against a horizontal plate 74 to which the end-piece 76 is welded. The bottom of the guide tube 80 abuts against the top of the valve body 88. The guide tube 80 houses a vertical rod 86 which is coaxial therewith. The rod 86 extends through a bush 78 held in the plate 74. The upper end of the rod is connected to a solenoid actuator 70 located in a housing 66 which is mounted on the plate 74. The actuator 70 is itself mounted on the plate 74 by means of a bracket 72. The lower end of the rod 86 extends through a bush 90 and is received in a cylindrical passage 91 in the valve body 88 by a generally conical valve member 92.

Figure 3:
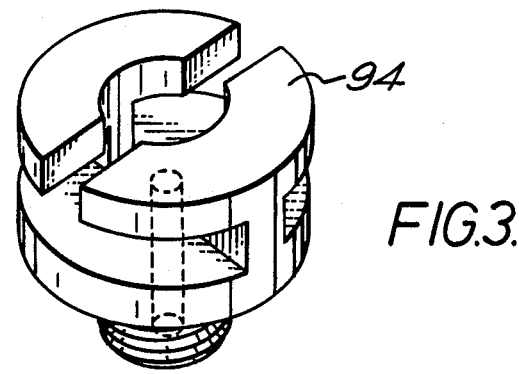
FIG. 3 is a schematic perspective view of a valve seat forming part of the apparatus shown in FIG. 2.

A compression spring 93 is housed in the annular space defined between the cavity 91 and the push-rod 86 and biases the valve member 92 into a fluid-tight engagement with a valve seat 94 which is shown in enlarged perspective in FIG. 3. The valve seat 94 has a central passage 97 and is received in the end of a block 98 of good heat conductive metal such as brass mounted in the lower end of the valve body 88. The block 98 has a central passage contiguous with the passage 97 in the valve seat 94. The central passage houses the upper end of a stainless steel tube 100 defining an outlet passage for liquid nitrogen. In order to prevent liquid nitrogen seeping between the valve seat 94 and the block 98 a polytetrfluoroethylene (PTFE) washer is engaged between the base of the valve seat 96 and the adjacent surface of the block 98. With the valve member 92 in the position shown in FIG. 3 the tube 100 is closed to inlet apertures 96 in the valve body 88 communicating with liquid nitrogen in the reservoir and accordingly while the valve is in this position no liquid nitrogen is able to be dispensed.

The dispensing tube 100 extends through the inner wall 54 and the outer wall 52 of the projection 58. A generally conical end-piece 102 receives the lower end of the tube 100 and makes a vacuum-tight connection between the wall 52 and the tube 100. Mounted to the end-piece 102 by means of a bracket 104 is a conical deflector 106. The deflector 106 is positioned vertically below the tip or dispensing orifice of the tube 100 so as to deflect drops of liquid nitrogen falling onto it.

Figure 5:
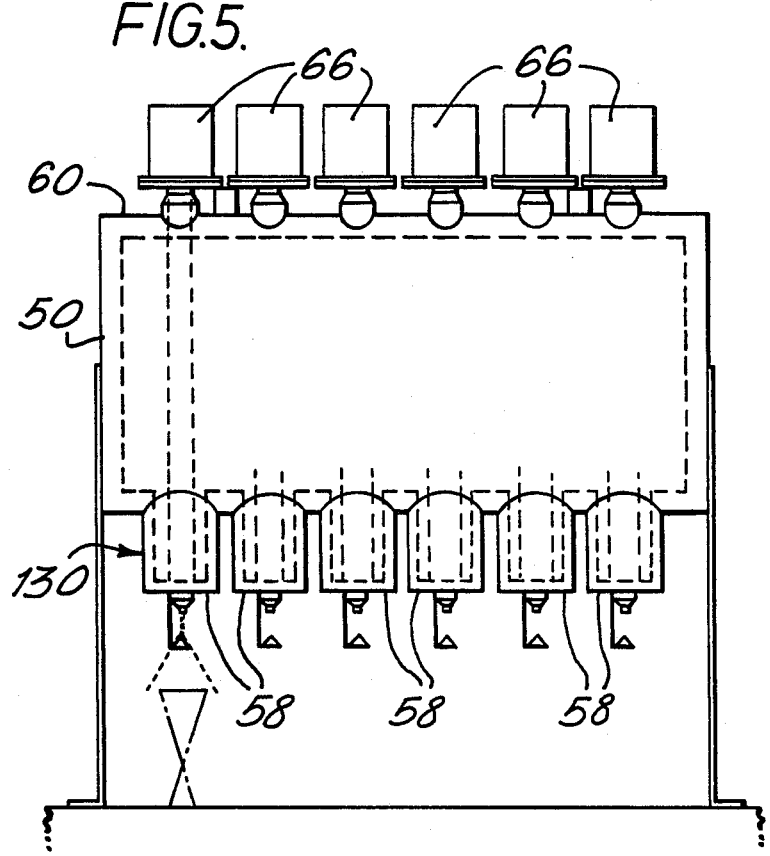
FIG. 5 is a schematic side elevation of the apparatus shown in FIG. 2.

The solenoid actuator 70 is adapted to raise the rod 86 and hence the valve member 92 against the bias of the compression spring 93. By this means the valve can be opened and liquid nitrogen can be dispensed. The volume of liquid nitrogen dispensed will depend on the length of the period of time for which the valve is open. The actuator 70 may be programmed so as to open and close the valve at chosen intervals. As shown in FIG. 5, there are six dispensing units 130. Each of these units can thus be programmed to dispense drops of liquid nitrogen is unison with one another.

Figure 6:
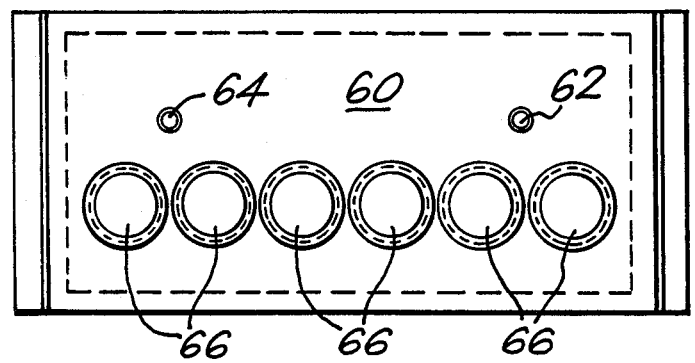
FIG. 6 is a schematic plan view of the apparatus shown in FIG. 2.

As shown in FIG. 6, the dispenser has an inlet 62 for liquid nitrogen and an outlet 64 for venting vaporised nitrogen. The outlet 64 is open to the atmosphere and thus atmospheric pressure can be maintained in the headspace of the reservoir 50 irrespective of the rate of evaporation of the liquid nitrogen in the reservoir.

Figure 4:
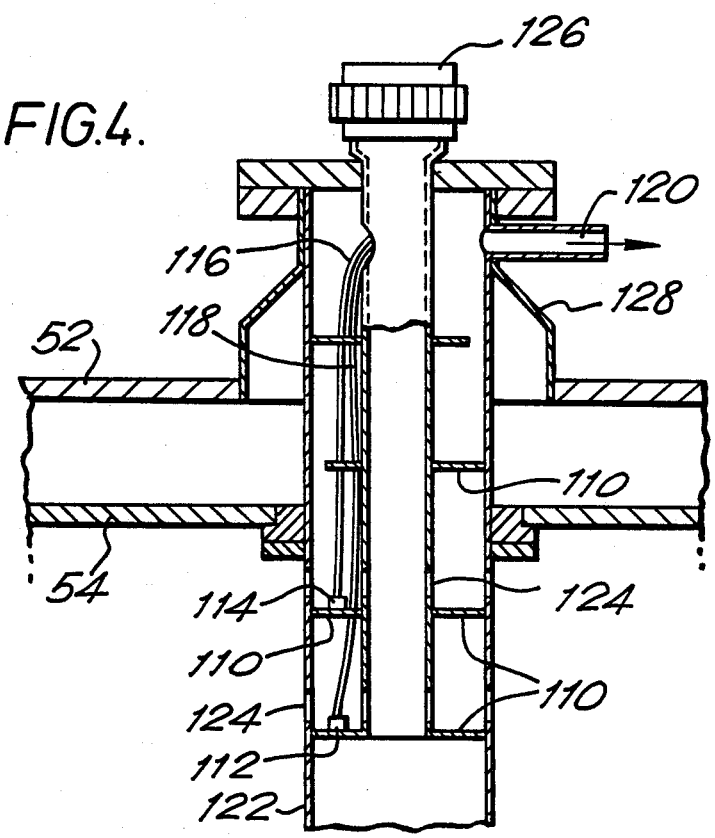
FIG. 4 is a schematic view of a level detector forming part of the apparatus shown in FIG. 2.

The arrangement for venting nitrogen vapour is shown in FIG. 4. A tube 122 extends from outside the top 60 of the reservoir through the walls 52 and 54 into the liquid nitrogen in the reservoir. The tube 122 is open at its lower end and has apertures 124 in its walls. The level of liquid nitrogen inside the tube 122 is thus the same as it is in the rest of the reservoir. The tube 122 has baffles 116 in it from which cold vapour gains heat, and above the baffles a vent passage 120 which communicates with the outlet 124.

A terminal 126 has electrical leads 116 and 118 extending into the tube 122. The leads 116 and 118 are connected to diodes 114 and 112 respectively located at different levels within the tube. The dispensing apparatus receives liquid nitrogen at a chosen rate from a bulk supply vessel (not shown). If the level of the liquid nitrogen reaches the upper diode 114 a valve (not shown) controlling introduction of liquid nitrogen from a bulk storage vessel into the dispensing apparatus is closed automatically. If the level of liquid nitrogen falls to that of the lower diode 112 the valve is reopened automatically so that more liquid nitrogen is supplied to the dispensing apparatus. By this means, the level of liquid nitrogen in the reservoir 50 can be kept substantially constant. Since the pressure in the headspace of the apparatus is maintained at atmospheric pressure the pressure at the level of the valve will remain approximately constant and thus the dispensing apparatus is capable of delivering a chosen volume of liquid nitrogen from each dispensing tube 100 at chosen intervals, the magnitude of the volume and the frequency of the intervals depending on the programming of the solenoid actuators. Once the actuators have been programmed the size of the drops or droplets delivered may be adjusted by replacing the seat 94 which one having a passage 97 of different diameter.

Similarly to the apparatus shown in FIG. 1, the diameter of the block 98 is at least three times that of the outlet passage defined by the delivery tube 100. The tube 100 makes a tight fit with the block 98 and thus good thermal contact is maintained between the two. The block 98 in effect acts as a 'cold sink' and thus helps to maintain liquid nitrogen in the tube 100 in liquid state until it has been dispensed.

The tubes 68 and 80 are formed with small apertures in their walls to prevent a build-up of hydraulic (or rather liquid nitrogen) pressure thereacross. In addition, copper baffles 110 are provided thereacross just below the top of the reservoir so as to dissipate heat conducted into the interior of the reservoir 50 from the solenoid actuators 70 etc. above the top 60 thereof. Moreover, foamed plastics insulation is situated in that part of the column 86, that is extends through the space between the walls 52 and 54 at the top of the reservoir 50.

I claim:

1. Apparatus for dispensing a cryogenic liquid comprising a thermally insulated reservoir for containing said cryogenic liquid; a substantially solid block of heat conductive material disposed in said reservoir and having a passage therethrough with the diameter of said substantially solid block being at least three times greater than the diameter of said passage; a first end of said passage adapted to dispense said cryogenic liquid from said reservoir and a second end of said passage disposed at a location in the reservoir spaced away from the thermal insulation thereof; and valve means disposed at said second end of said passage for selectively admitting said cryogenic liquid into said passage wherein evaporation of said cryogenic liquid is substantially precluded prior to its discharge from said first end thereof.

2. Apparatus according to claim 1 in which the passage is defined by the block.

3. Apparatus according to claim 1 in which the passage is defined by a delivery tube, that portion of such tube situated within the reservoir being received within the block.

4. Apparatus according to claim 1 in which in the valve means comprises a valve member, a valve seat, a compression spring biasing the valve member into valve-closing engagement with the valve seat, a valve body having at least one inlet in communication with the cryogenic liquid in the reservoir, and means for displacing the valve member against the bias of the spring into a position in which the valve is open.

5. Apparatus according to claim 4, in which the means for displacing the valve member includes a rod connected to or integral with the valve member.

6. Apparatus according to claim 5, in which the rod is actuated by means of a solenoid actuator.

7. Apparatus according to claim 4, in which the valve seat is provided by a face of the block.

8. Apparatus according to claim 4, in which the valve seat is in the form of a nozzle removably mounted on the block.

9. Apparatus according to claim 1 in which there is a plurality of spaced-apart outlet passages, each in its own block and associated with its own valve means.

10. Apparatus according to claim 1, additionally including means for venting vaporized cryogenic liquid from a vessel defining the reservoir so as to maintain the headspace in such vessel at substantially constant pressure.

11. Apparatus according to claim 1, additionally including level detectors operatively associable with means for replenishing the reservoir with said cryogenic liquid so as to maintain an approximately constant liquid level in the reservoir.

12. Apparatus for dispensing a cryogenic liquid comprising a thermally insulated reservoir for containing said cryogenic liquid and having inner and outer walls and a vacuum therebetween; a substantially solid block of heat conductive material disposed entirely within said reservoir and having a passage therethrough with the diameter of said substantially solid block being at least three times greater than the diameter of said passage; a first end of said passage communicating with a delivery tube which is adapted to dispense said cryogenic liquid from said reservoir at said outer wall and a second end of said passage disposed at a location in the reservoir spaced away from said inner wall; and valve means disposed at said second end of said passage for selectively admitting said crogenic liquid into said passage wherein evaporation of said cryogenic liquid is substantially precluded prior to its discharge from said first end thereof.

13. Apparatus according to claim 12 in which the valve means comprises a valve member, a valve seat, a compression spring biasing the valve member into valve-closing engagement with the valve seat, a valve body having at least one inlet in communication with the cryogenic liquid in the reservoir, and means for displacing the valve member against the bias of the spring into a position in which the valve is open.

14. The apparatus according to claim 13 in which the means for displacing the valve member includes a rod connected to or integral with the valve member.

15. The apparatus according to claim 14 in which the rod is activated by means of a solenoid actuator.

16. The apparatus according to claim 12 in which there are a plurality of spaced apart outlet passages, each in its own block and associated with its own valve means.

* * * * *